(12) United States Patent
Raman

(10) Patent No.: US 9,582,851 B2
(45) Date of Patent: Feb. 28, 2017

(54) USING PROXIMITY SENSING TO ADJUST INFORMATION PROVIDED ON A MOBILE DEVICE

(71) Applicant: Microsoft Technology Licensing, LLC, Redmond, WA (US)

(72) Inventor: Sunder Raman, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 14/186,184

(22) Filed: Feb. 21, 2014

(65) Prior Publication Data

US 2015/0242993 A1     Aug. 27, 2015

(51) Int. Cl.
| | |
|---|---|
| *G09G 5/26* | (2006.01) |
| *G09G 3/34* | (2006.01) |
| *G06K 15/02* | (2006.01) |
| *G06K 9/03* | (2006.01) |
| *G06T 11/00* | (2006.01) |
| *G06T 11/60* | (2006.01) |
| *G06T 3/40* | (2006.01) |
| *G06F 3/0481* | (2013.01) |
| *G06F 3/0346* | (2013.01) |
| *G06F 3/01* | (2006.01) |
| *G01V 8/12* | (2006.01) |
| *G06F 3/03* | (2006.01) |

(52) U.S. Cl.
CPC ............... *G06T 3/40* (2013.01); *G01V 8/12* (2013.01); *G06F 3/012* (2013.01); *G06F 3/017* (2013.01); *G06F 3/0304* (2013.01); *G06T 11/001* (2013.01); *G06F 2203/04806* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 6,864,912 B1 | 3/2005 | Mahaffey et al. | |
| 7,289,102 B2 * | 10/2007 | Hinckley et al. | ............. 345/156 |
| 8,203,577 B2 | 6/2012 | Hoover | |
| 8,209,635 B2 | 6/2012 | Thom | |
| 8,427,476 B2 | 4/2013 | Chen et al. | |
| 8,515,491 B2 | 8/2013 | Das et al. | |

(Continued)

FOREIGN PATENT DOCUMENTS

| | | |
|---|---|---|
| EP | 1426919 A1 | 6/2004 |
| EP | 2 109 030 A2 | 10/2009 |

(Continued)

OTHER PUBLICATIONS

International Search Report and Written Opinion for International Application No. PCT/US2015/016235, date of mailing: May 11, 2015, date of filing: Feb. 18, 2015, 11 pages.

(Continued)

*Primary Examiner* — Wesner Sajous
(74) *Attorney, Agent, or Firm* — David Ream; Tom Wong; Micky Minhas

(57) ABSTRACT

A proximity metric is obtained that indicates a proximity of a user's face relative to a mobile device. The content, or a visual characteristic of information, on a user interface of the mobile device is adjusted, based upon the proximity metric.

20 Claims, 17 Drawing Sheets

(56) References Cited

U.S. PATENT DOCUMENTS

| | | | |
|---|---|---|---|
| 8,599,148 B2 | 12/2013 | Chung et al. | |
| 2003/0058259 A1* | 3/2003 | Kawaguchi | G06F 17/5018 345/646 |
| 2003/0142328 A1* | 7/2003 | McDaniel | H04N 1/00408 358/1.9 |
| 2003/0195644 A1* | 10/2003 | Borders | A47C 31/008 700/90 |
| 2005/0052558 A1* | 3/2005 | Yamazaki | G06K 9/228 348/333.12 |
| 2009/0079765 A1* | 3/2009 | Hoover | 345/660 |
| 2009/0141147 A1* | 6/2009 | Alberts | G06F 3/012 348/240.99 |
| 2010/0079356 A1* | 4/2010 | Hoellwarth | G02B 27/017 345/8 |
| 2010/0166484 A1* | 7/2010 | Edwards | B41J 11/003 400/642 |
| 2010/0188426 A1 | 7/2010 | Ohmori et al. | |
| 2010/0194909 A1* | 8/2010 | Funado | G06T 11/001 348/222.1 |
| 2011/0084897 A1 | 4/2011 | Manoharan et al. | |
| 2012/0038546 A1 | 2/2012 | Cromer et al. | |
| 2012/0243735 A1 | 9/2012 | Wu | |
| 2012/0287163 A1 | 11/2012 | Djavaherian | |
| 2013/0033485 A1 | 2/2013 | Kollin et al. | |
| 2013/0057573 A1* | 3/2013 | Chakravarthula | G06F 3/005 345/619 |
| 2013/0088434 A1* | 4/2013 | Masuda | G06F 1/3262 345/173 |
| 2013/0311920 A1* | 11/2013 | Koo et al. | 715/765 |
| 2014/0368456 A1* | 12/2014 | Sakai | G06F 3/0488 345/173 |
| 2015/0019227 A1* | 1/2015 | Anandarajah | 704/257 |
| 2015/0067560 A1* | 3/2015 | Cieplinski | G06F 3/04842 715/765 |
| 2015/0102995 A1* | 4/2015 | Shen | G06F 3/013 345/156 |

FOREIGN PATENT DOCUMENTS

| | | |
|---|---|---|
| EP | 2 453 342 A2 | 5/2012 |
| EP | 2605125 A1 | 6/2013 |
| GB | 2467898 A | 8/2010 |

OTHER PUBLICATIONS

International Preliminary Report on Patentability for International Patent Application No. PCT/US2015/016235, date of mailing: May 11, 2016, date of filing: Feb. 18, 2015, 15 pages.

"Second Written Opinion Issued in PCT Application No. PCT/US2015/016235", Mailed Date: Jan. 18, 2016, 7 Pages.

\* cited by examiner

USING PROXIMITY SENSING TO ADJUST INFORMATION PROVIDED ON A MOBILE DEVICE

BACKGROUND

Computing devices are currently in wide use. Some such computing devices include smart phones, tablet computers, handheld computers, electronic reading devices, multi-media player devices, among others.

These and other types of mobile devices include a wide variety of sensors. For instance, some such sensors include gyroscope sensors, accelerometers, ambient light sensors, cameras, global positioning sensors, other types of orientation sensors and various sensors that indicate whether the mobile device is plugged into any other device. Such sensors can be used to turn on or off the display on the device, or to enable or disable certain features. For instance, some smart phones include a small infrared sensor near the microphone. The sensor signal from the infrared sensor is processed to determine whether a user's face is in close proximity to the device. If so, the smart phone determines that the user is making a call, with the phone to his or her ear, and therefore turns off the display device and disables the touch sensitive inputs on the display screen.

Other mobile devices use a camera to perform facial recognition on a user. The facial recognition can be used to lock or unlock the mobile device.

Currently, regardless of whether a mobile device has these types of sensors, the display is static. That is, the content of the information, or a visual characteristic of the content, presented through a user interface on the mobile device is not changed. Instead, the display may be turned on or off, but the content itself is unchanged.

The discussion above is merely provided for general background information and is not intended to be used as an aid in determining the scope of the claimed subject matter.

SUMMARY

A proximity metric is obtained that indicates a proximity of a user's face relative to a mobile device. The content or a visual characteristic of information, on a user interface of the mobile device is adjusted, based upon the proximity metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
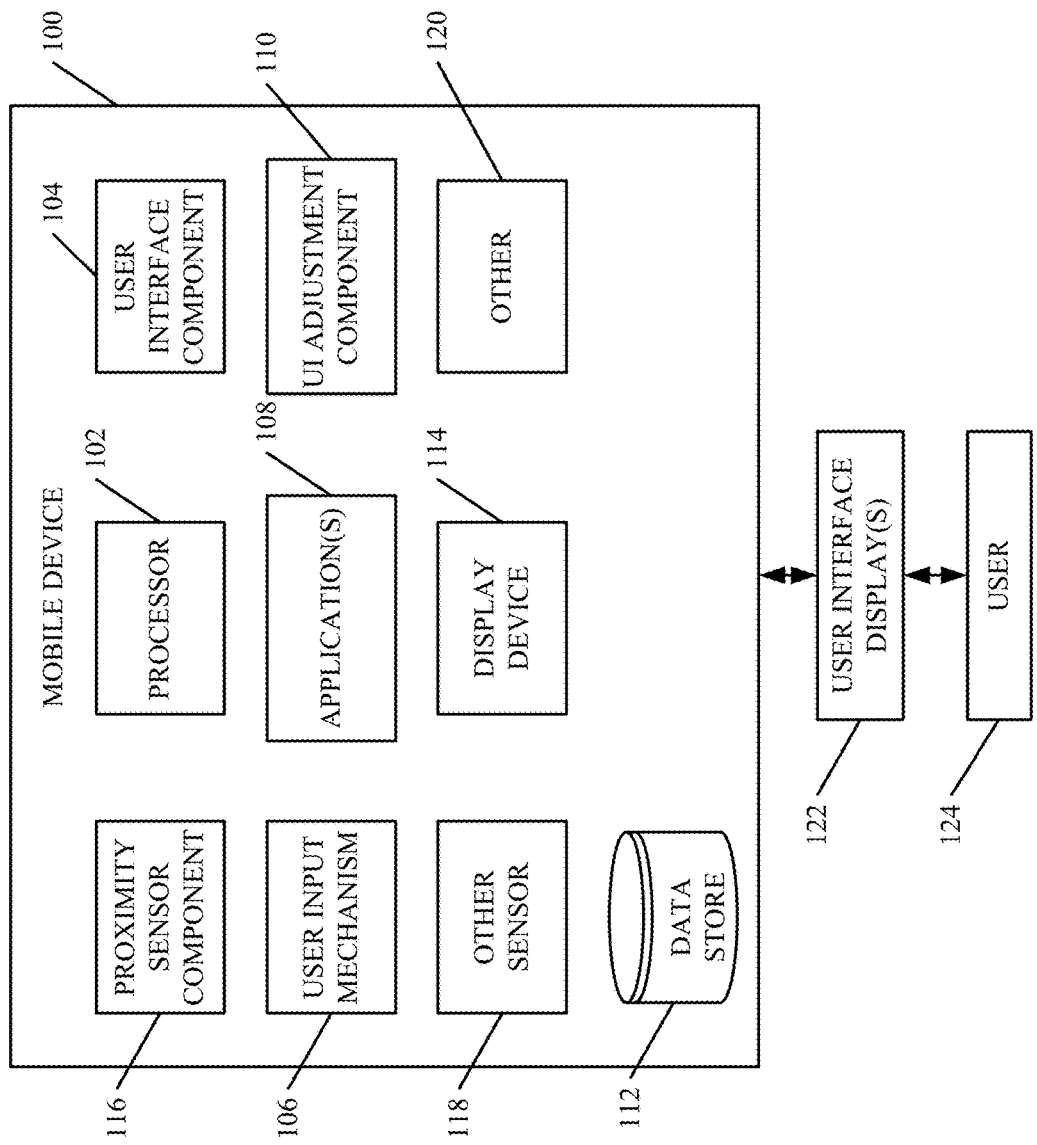
FIG. 1 is a block diagram of one embodiment of a mobile device.

FIG. 1 is a block diagram of one illustrative mobile device 100. Mobile device 100 illustratively includes processor 102, user interface component 104, user input mechanisms 106, applications 108, user interface adjustment component 110, data store 112, display device 114, proximity sensor component 116, other sensors 118, and it can include a variety of other items 120 as well.

In one embodiment, user interface component 104, either under the control of processor 102 or other items of mobile device 100, or by itself, generates user interface displays 122 that are displayed to user 124. User interface displays 122 can have user input mechanisms that user 124 can interact with in order to control and manipulate mobile device 100. Display device 114 is illustratively used to display the user interface displays 122. It can be a touch sensitive display device or a wide variety of other types of display devices which are described below. In addition, user input mechanisms 106 can include keypads, switches, buttons, thumb pads, etc., which user 124 can interact with to control and manipulate mobile device 100 as well.

Applications 108 can include a wide variety of different types of applications (some of which are described in more detail below with respect to FIGS. 4-8). Data store 112 illustratively stores data and other information for processor 102 and applications 108. Processor 102 illustratively runs applications 108, as well as an operating system, for mobile device 100.

Proximity sensor component 116 can be a wide variety of different types of sensor components that sense a proximity of mobile device 100, relative to a user's face. Some various embodiments of proximity sensor component 116 are also described below with respect to FIG. 2. Other sensors 118 can include a wide variety of different types of sensors, a number of which are also described below with respect to FIG. 2. In one embodiment, user interface (UI) adjustment component 110 receives signals from proximity sensor component 116 and other sensors 118 (if desired) and adjusts the content of information, or a visual characteristic of the information (which does not include simply turning on or off the display), provided on a user interface of mobile device 100. For instance, it can adjust the content of information displayed on user interface displays 122, the size of the content, or other things.

Before describing the overall operation of mobile device 100 and UI adjustment component 110 in more detail, an overview will first be provided in order to enhance understanding. Proximity sensor component 116 first senses and generates a signal indicative of a proximity of mobile device 100, relative to the face of user 124. Other sensors sense other information, such as the ambient light conditions of mobile device 100, whether certain items are plugged into mobile device 100 (such as whether a headphone is plugged into a headphone jack), and other items. The output from sensor component 116 and other sensors 118 is illustratively provided to UI adjustment component 110 which adjusts the content, or a visual characteristic of the content, displayed on displays 122, based upon those inputs.

For instance, where proximity sensor component 116 provides an output indicating that the user's face is fairly distant from the display device 114 of mobile device 100, UI adjustment component 110 can adjust the displayed content by increasing its size so that user 124 can better view the content. By way of example, UI adjustment component 110 can increase the font size of text displayed in the user interface displays 122. Where images are displayed, UI adjustment component 110 can increase the size of those images. Also, if the output of proximity sensor component 116 indicates that the user's face is relatively close to display device 114, UI adjustment component 110 can reduce the size of those items as well. Similarly, where other sensors 118 indicate that the ambient light conditions are poor, then UI adjustment component 110 can adjust the lighting configuration (such as the backlight, the brightness, or other lighting parameters) of mobile device 100 to enhance the user's experience. It should also be noted that, in one embodiment, the output from proximity sensor component 116 and optionally other sensors 118 and UI adjustment component 110 can be provided to the applications 108 which, themselves, adjust the UI content. Similarly, the UI content adjustments can be made automatically by the operating system of mobile device 100, or in other ways.

Figure 2A:
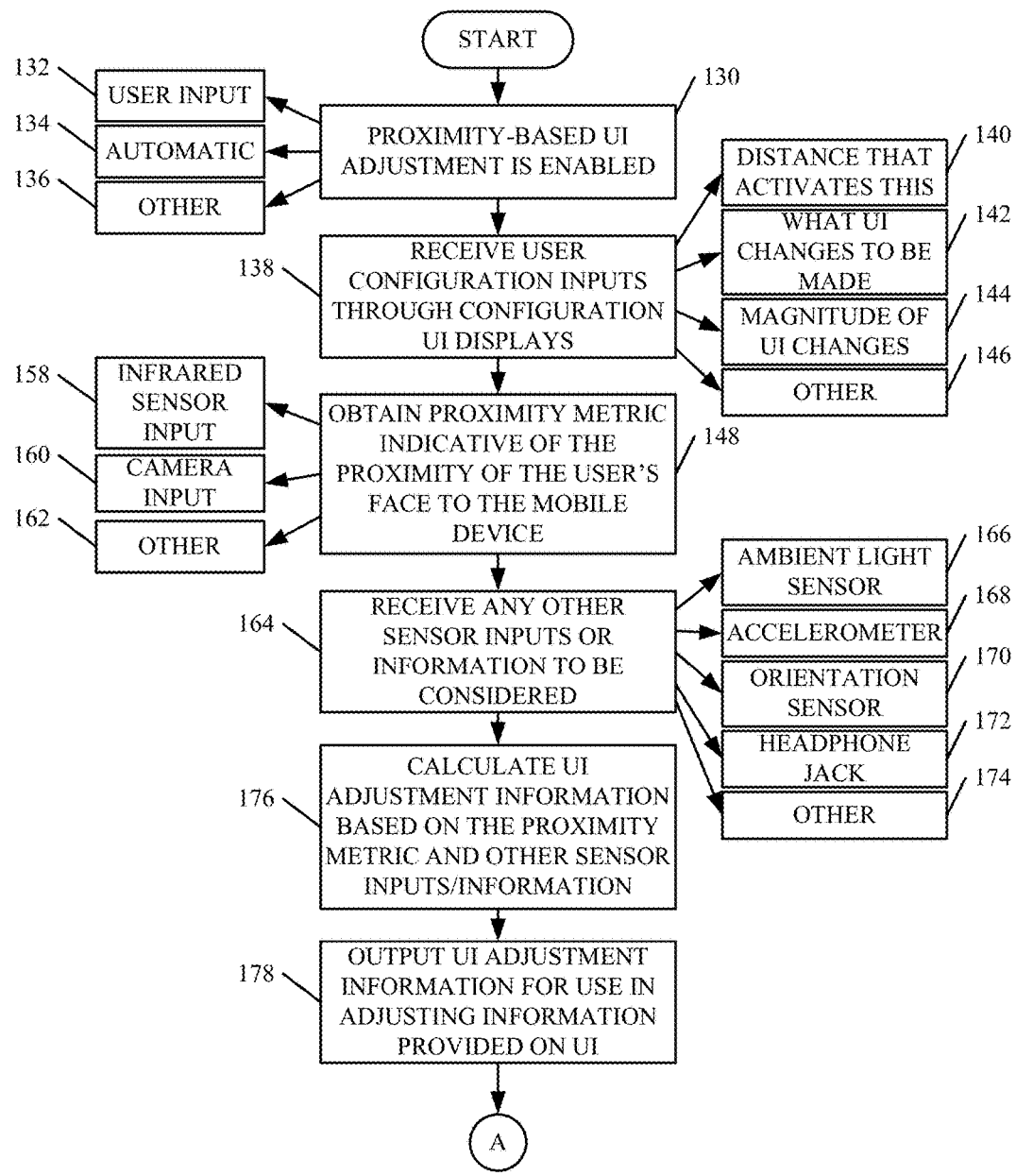
FIGS. 2A and 2B (collectively referred to as FIG. 2) show a flow diagram illustrating one embodiment of the operation of the mobile device shown in FIG. 1 in adjusting a visual characteristic of the content of information provided on a user interface of the mobile device.
Figure 2B:
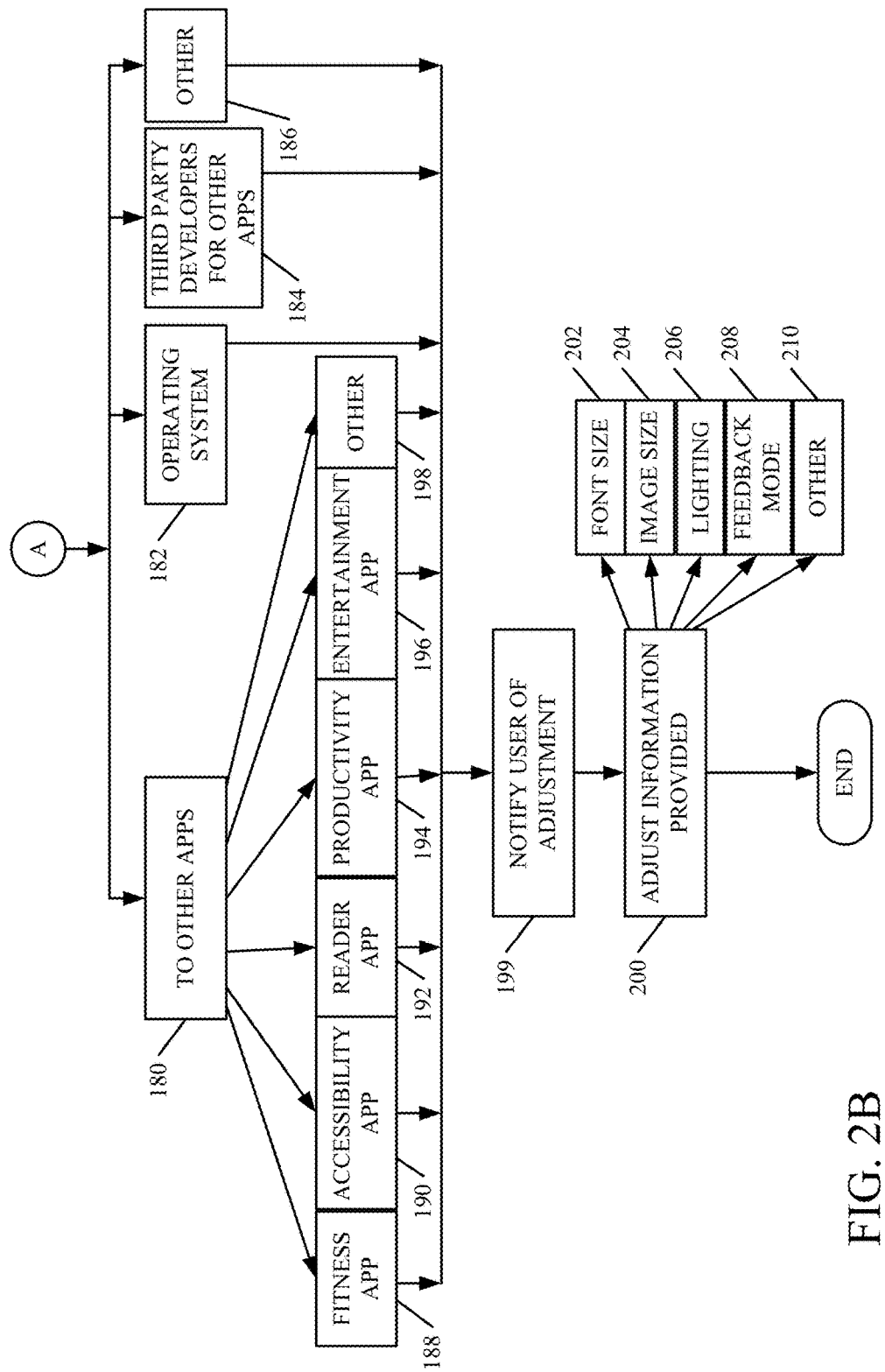

A more detailed discussion of one embodiment of the operation of mobile device 100 in making UI content adjustments will now be provided. FIGS. 2A and 2B (collectively FIG. 2) show a flow diagram illustrating a more detailed embodiment of the operation of mobile device 100. FIGS. 3A-3H show illustrative user interface displays. FIGS. 1-3H will now be described in conjunction with one another.

In one embodiment, the proximity-based UI adjustment performed by adjustment component 110 or other applications or items of mobile device 100 can illustratively be enabled or disabled by user 124. Therefore, it is first assumed that the proximity-based UI adjustment is enabled. This is indicated by block 130 in FIG. 2. This can be done by generating a user interface display with user input mechanisms that allow user 124 to enable or disable the proximity-based UI adjustment. This is indicated by block 132. It can also be done automatically by mobile device 100, based on certain sensed conditions. For instance, if component 110 receives accelerometer inputs from other sensors 118 and ambient light condition sensors from other sensors 118 indicating that the phone is in a user's briefcase, then the proximity-based UI adjustment can be automatically disabled. Automatically enabling or disabling the proximity-based UI adjustment is indicated by block 134. It can be enabled or disabled in other was as well, and this is indicated by block 136.

Also, in one embodiment, the proximity-based UI adjustment is configurable by user 124. Therefore, in the embodiment shown in FIG. 2, mobile device 100 receives user configuration inputs through a configuration user interface display. This is indicated by block 138 in FIG. 2. The user interface display can have user inputs mechanisms that allow user 124 to set a distance (such as the distance from mobile device 100 to the user's face) where the adjustments will take place. This is indicated by block 140. It can display user input mechanisms that allow the user to identify the particular user interface changes that are to be made (such as whether text is to be enlarged, whether images are to be enlarged, whether backlighting is to be changed, etc.). This is indicated by block 142. It can also include user input mechanisms that allow user 124 to set a magnitude of the user interface changes based upon the proximity. For instance, if the phone is far distant from the user's face, then the user interface adjustments may be to greatly enlarge text and images. If it is in a midrange, then they may only be somewhat enlarged, and if it is near, they may be reduced in size or unchanged. Allowing the user to set the magnitude of the user interface changes is indicated by block 144. The user can configure the user interface adjustments in other ways as well, and this is indicated by block 146.

Figure 3A:
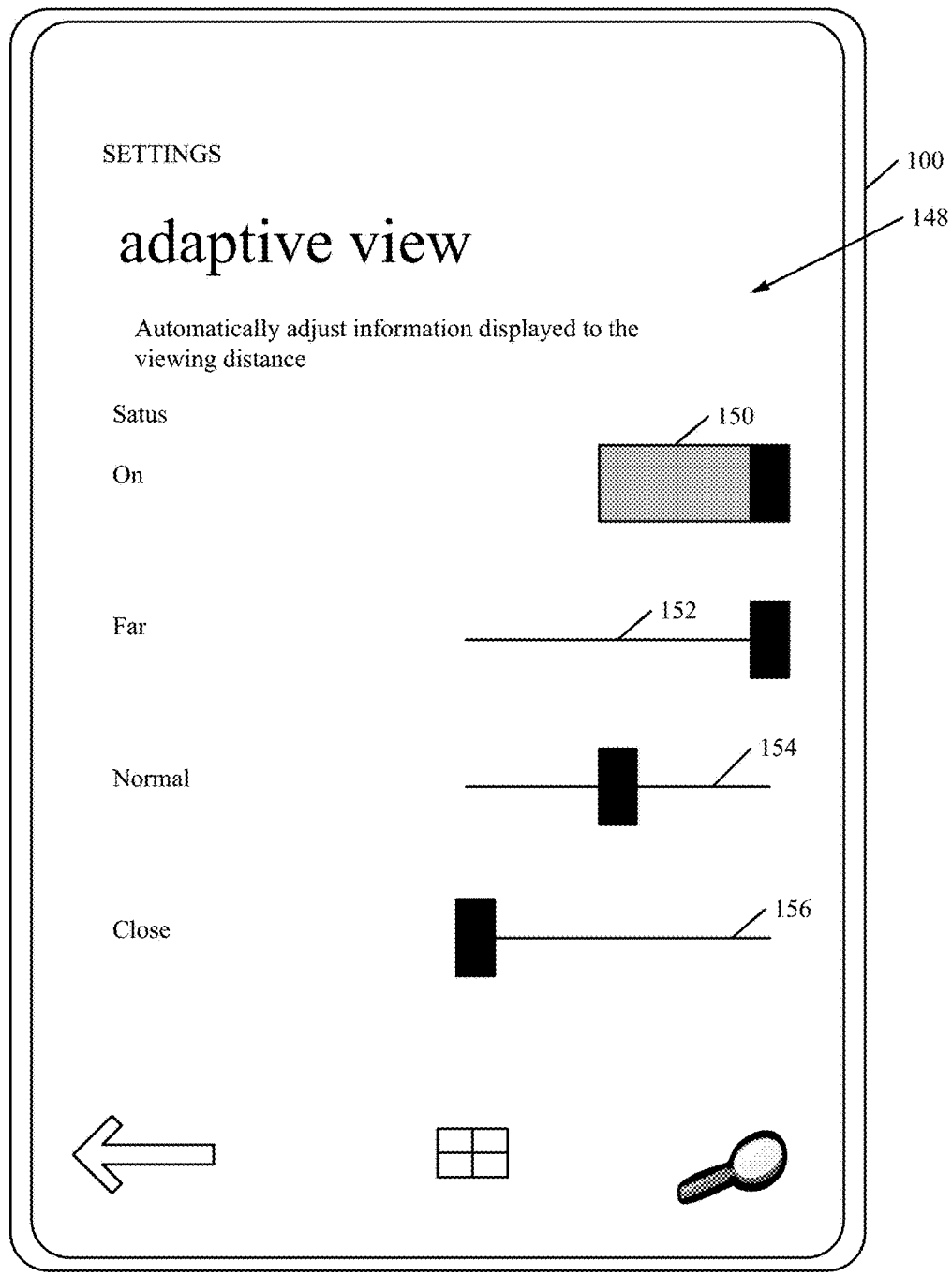
FIGS. 3A-3H show various user interface displays on one exemplary mobile device.

FIG. 3A shows one illustrative embodiment of a mobile device 100 with a user interface display 148 that allows the user to configure the UI adjustment. It can be seen in FIG. 3A that a first user input mechanism 150 allows the user to turn the adaptive view (i.e., the proximity-based UI adjustment) on or off. User interface display 148 also illustratively includes adjustment magnitude user input mechanisms 152, 154 and 156. Magnitude user input mechanism 152 allows user 124 to set the magnitude of the UI adjustments that are made when the proximity sensor component 116 indicates that the user's face is far from mobile device 100. User input mechanism 154 allows the user to set the magnitude of the adjustments made when the distance is in a mid or normal range, and user input mechanism 156 allows user 124 to set the adjustment magnitude when the user's face is close to mobile device 100. It will be noted that FIG. 3A shows only one embodiment for user configurable settings, and others can be used as well.

After the user has configured the proximity-based UI adjustment, proximity sensor component 116 obtains a proximity metric indicative of the proximity of the user's face to the mobile device. This is indicated by block 148 in FIG. 2. This can also be done in a wide variety of different ways. For instance, in one embodiment, proximity sensor component 116 includes an infrared sensor that provides an infrared sensor input 158. Component 116 then calculates the distance of the user's face from the infrared sensor, based upon the infrared sensor input signal.

In another embodiment, proximity sensor component 116 includes a camera that provides a camera input 160. Component 116 then calculates the distance that the user's face is from the camera based upon the camera input. By way of example, user 124 may be asked to go through a calibration process where the user is requested to hold the camera approximately 6 inches (or another specified distance) away from the user's face. Proximity sensor component 116 can then use facial recognition to correlate the distance to the approximate radius of the user's face in the captured image. Component 116 can then use that calibration in order to calculate the distance that the user's face is from the camera during later measurements. Also, proximity sensor component 116 can generate the proximity metric in other ways as well, and this is indicated by block 162.

Mobile device 100 then receives any other sensor inputs from other sensors 118, or other information to be considered in making the proximity-based UI adjustment. This is indicated by block 164. For instance, UI adjustment component 110 can receive an input from an ambient light sensor 166, from an accelerometer 168, from an orientation sensor 170, from the headphone jack 172, or it can receive other sensor inputs or other information as indicated by block 174. UI adjustment component 110 then calculates UI adjustment information based upon the proximity metric and the other sensor inputs or other information that is to be considered (if any). This is indicated by block 176 in FIG. 2. For instance, UI adjustment component 110 (or any other component that is making UI adjustments) calculates the specific UI adjustments to make (e.g., increase text font size to X and increase backlight, etc.) based upon the received information. The UI adjustment information is then output for use in adjusting information provided on a user interface of mobile device 100. This is indicated by block 178 in FIG. 2.

It will be noted that the UI adjustment information can be output to a wide variety of other components or items on mobile device 100 that may be making UI adjustments. For instance, it can be output to other applications 108, as indicated by block 180 in the flow diagram of FIG. 2. It can also be output to an operating system as indicated by block 182. It can be made available to third-party developers for development of other applications as indicated by block 184, or it can be output to other items 186 as well.

The other applications that the UI adjustment information can be provided to can be any of a wide variety of different types of applications. For instance, they can be fitness applications 188, accessibility applications 190, reader applications 192, productivity applications 194 (such as word processing applications, spreadsheets, presentation applications, etc.), entertainment applications 196 or other applications 198. Regardless of where the UI adjustment information is provided, the UI content, or a visual characteristic of the content, is illustratively adjusted based upon the UI adjustment information. In one embodiment, the user can first be notified and given an option to cancel the adjustment. This is indicated by block 199 in FIG. 2. In that case, no adjustment is made. Assuming, the user does not cancel the adjustment, the UI adjustment is made. This is indicated by block 200 in the flow diagram of FIG. 2.

As briefly mentioned above, the adjustments can take a wide variety of different forms. For example, the UI adjustments can be to adjust font size 202, to adjust image size 204, to adjust lighting characteristics of mobile device 100 as indicated by block 206, they can be adjustments to the feedback mode (such as switching from a video feedback to an audio feedback mode) as indicated by block 208, or they can include a wide variety of other adjustments as well, as indicated by block 210.

Figure 3B:
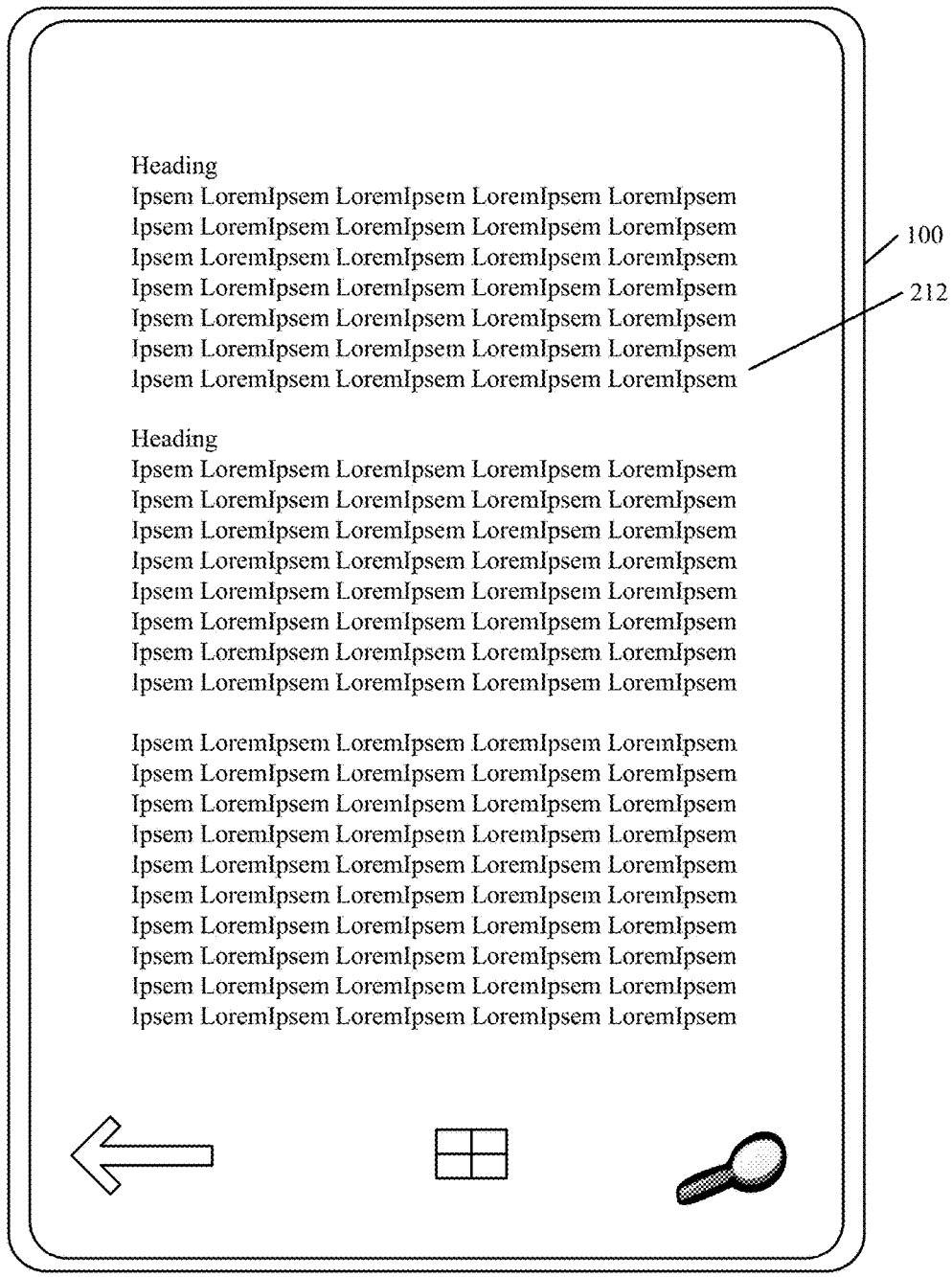

A number of different examples of UI adjustments that can be made will now be described with respect to FIGS. 3B-3H. For instance, assume that user 124 is reading a document or otherwise has text displayed on the display device 114 of mobile device 100. FIG. 3B shows one embodiment of this. It can be seen in FIG. 3B that mobile device 100 has a user interface display 212 that shows text of a certain font size.

Figure 3C:
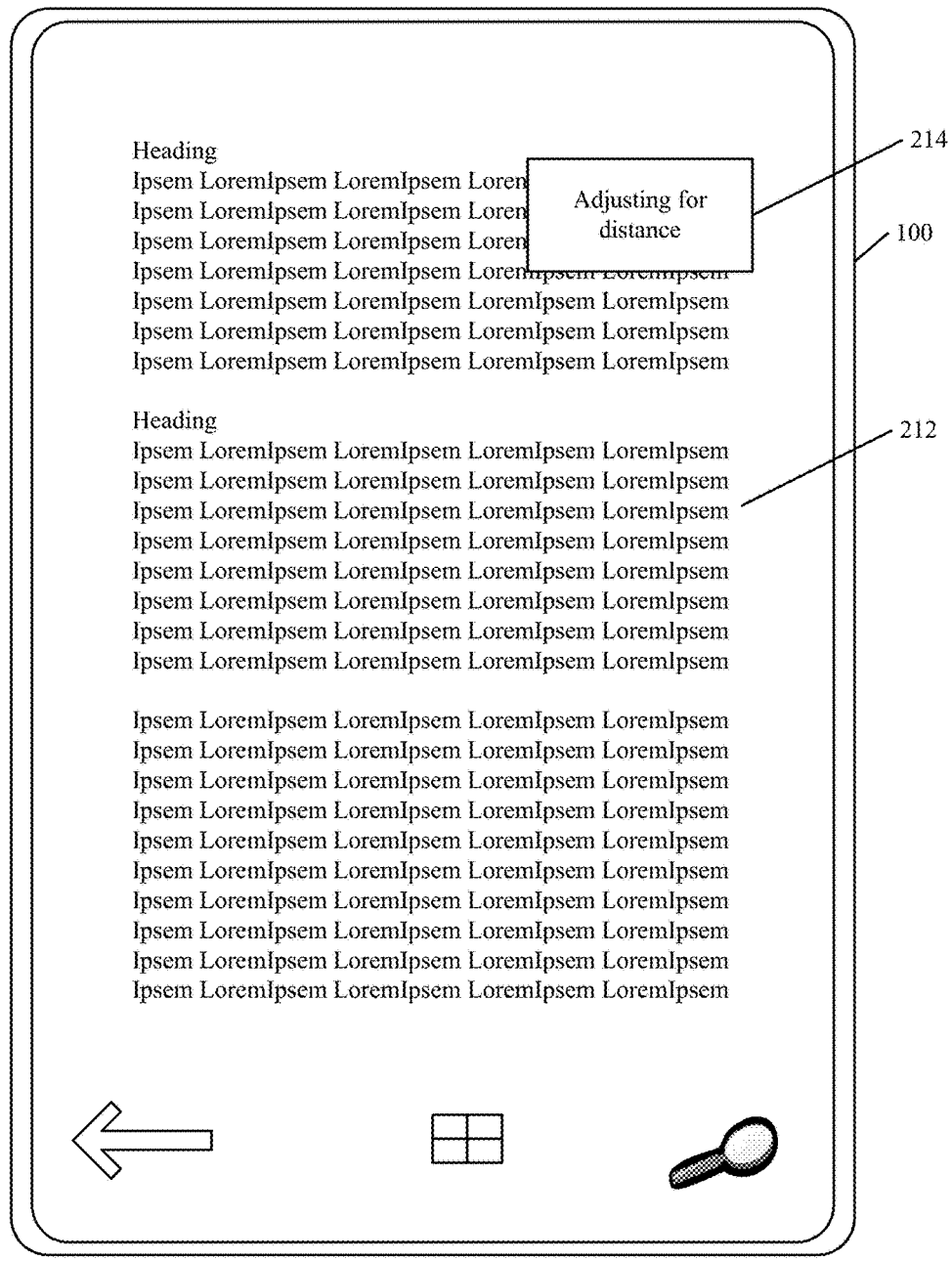

It is next assumed that proximity sensor component 116 senses that the user has moved the device further from the user's face. In that case, UI adjustment component 110 can illustratively provide a user notification before the device adjusts the UI content based upon the change in distance. FIG. 3C shows one embodiment of this. In the embodiment shown in FIG. 3C, user interface display 212 now includes a notification display portion 214. The notification display portion 214 notifies the user that the content on the UI display is being adjusted for distance. In one embodiment, the user can simply tap the notification display portion 214 to cancel the adjustment or to take the user to the settings so that the user can reconfigure the UI adjustment settings.

Figure 3D:
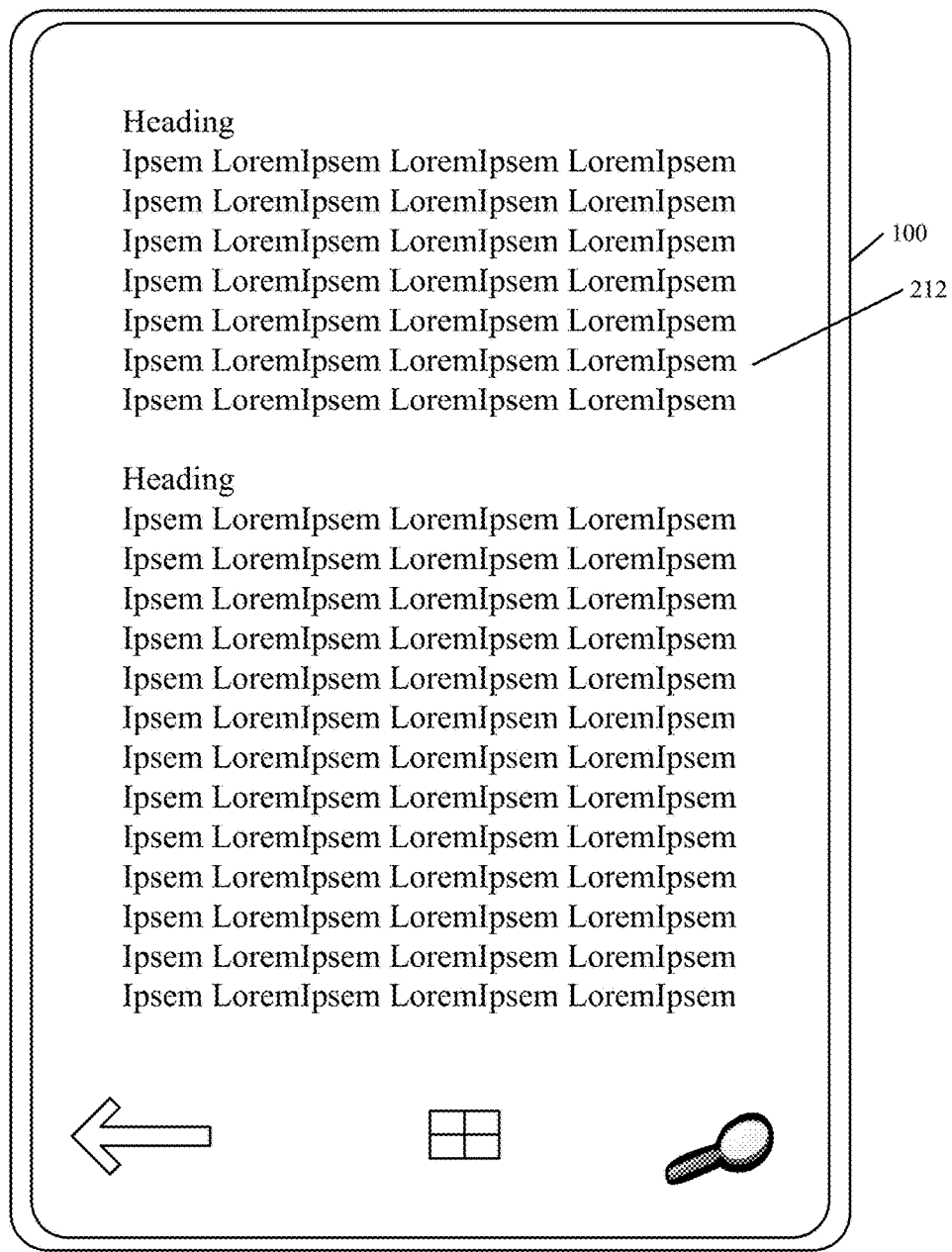

Assuming that the user does not cancel the UI adjustment, FIG. 3D shows one embodiment of mobile device 112 where the user interface display 212 now includes the textual display. It can be seen that the text is displayed in a larger font, in order to accommodate for the increased distance between the user's face and mobile device 100.

Figure 3E:
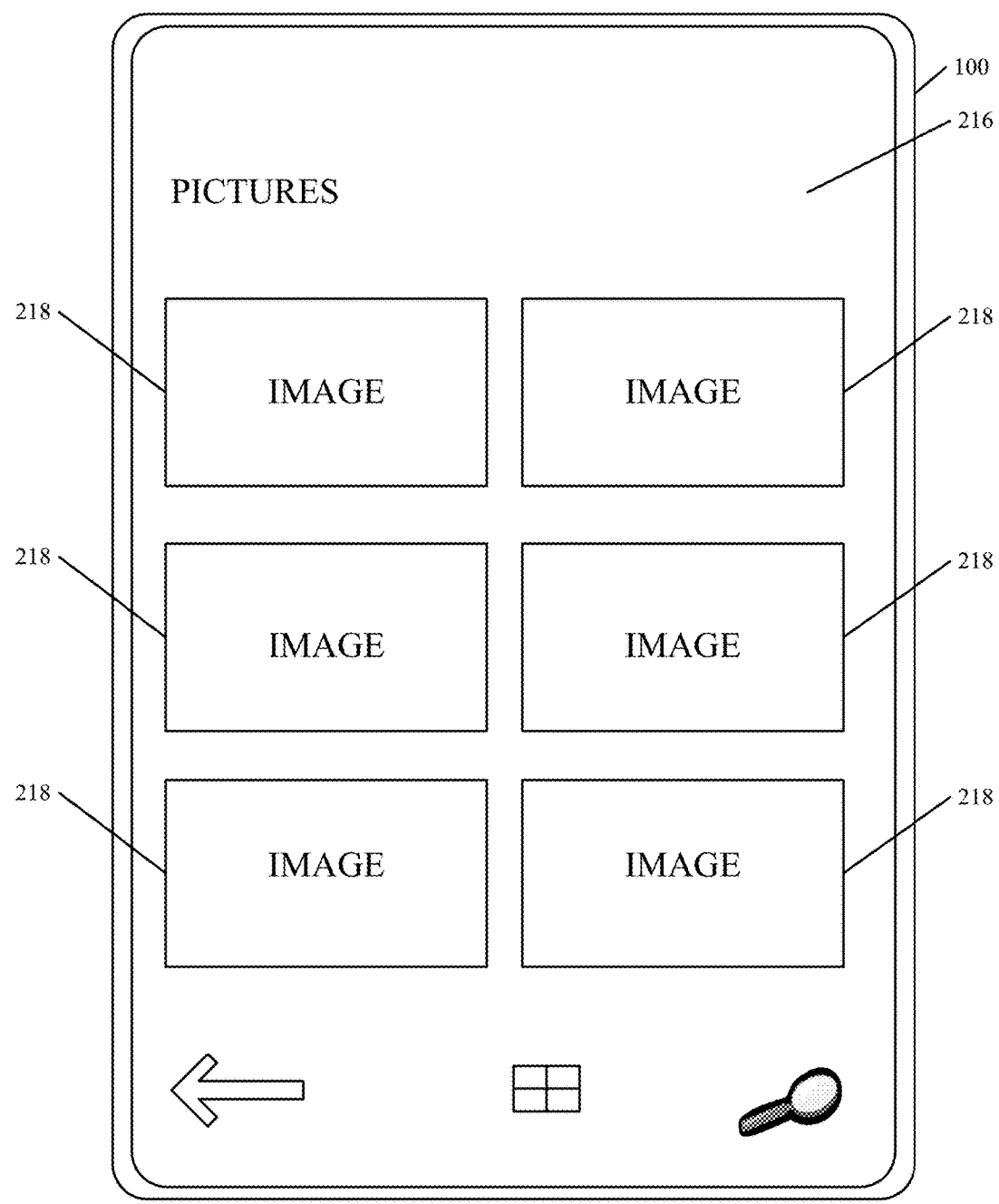
Figure 3F:
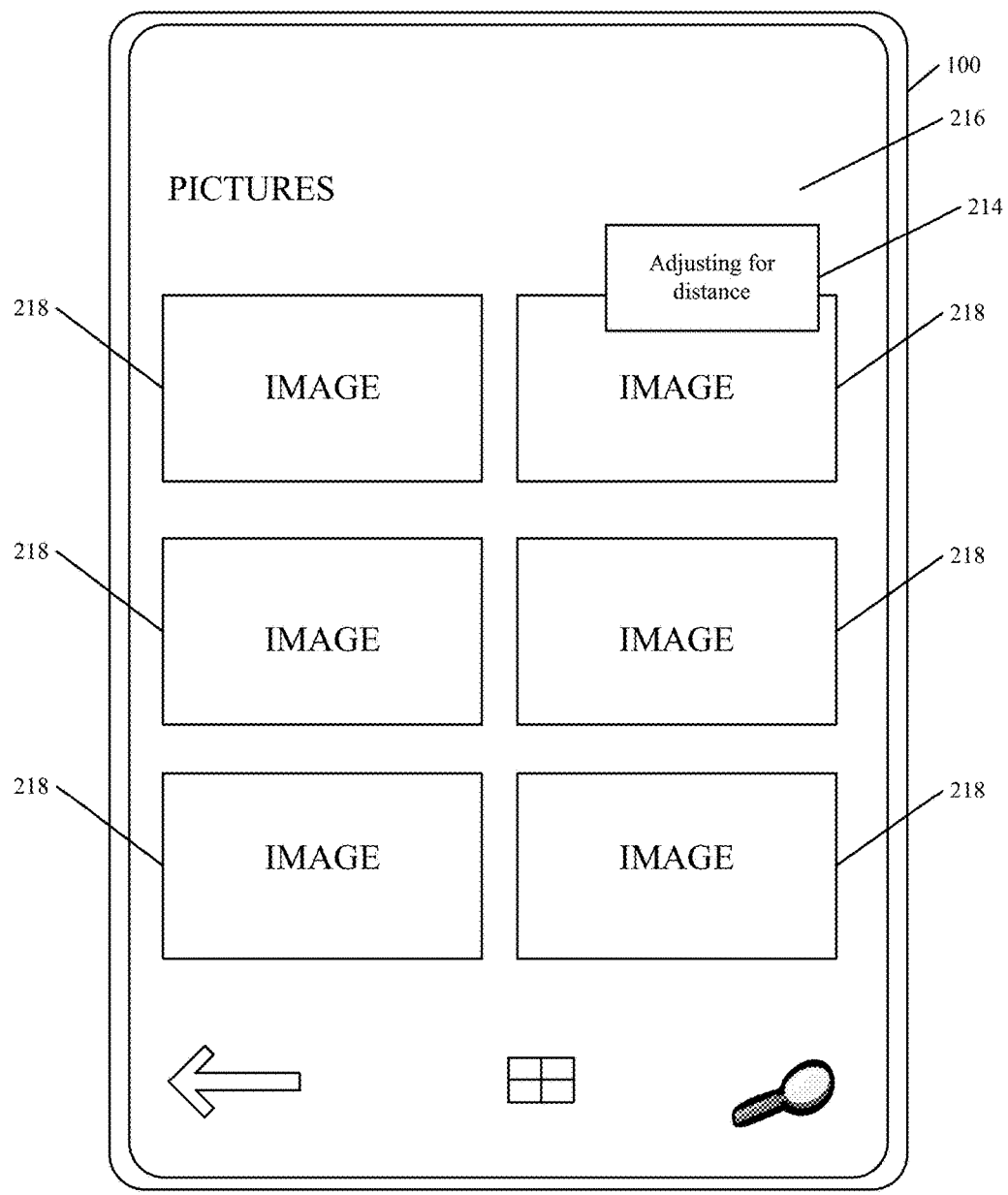

FIG. 3E shows another example of a user interface display to illustrate a different user interface adjustment. In FIG. 3E, mobile device 100 has a user interface display 216 that is displaying a plurality of different pictures 218. The display is adjusted based upon a current distance that the user's face is from mobile device 100. FIG. 3F shows that the user has moved the mobile device 100 closer to his or her face. Thus, user interface display 216 can again display the user notification display portion 214 indicating that the user interface content is being adjusted for distance. Again, the user can cancel the adjustment or navigate to an adjustment settings display, or simply allow the adjustment to take place.

Figure 3G:
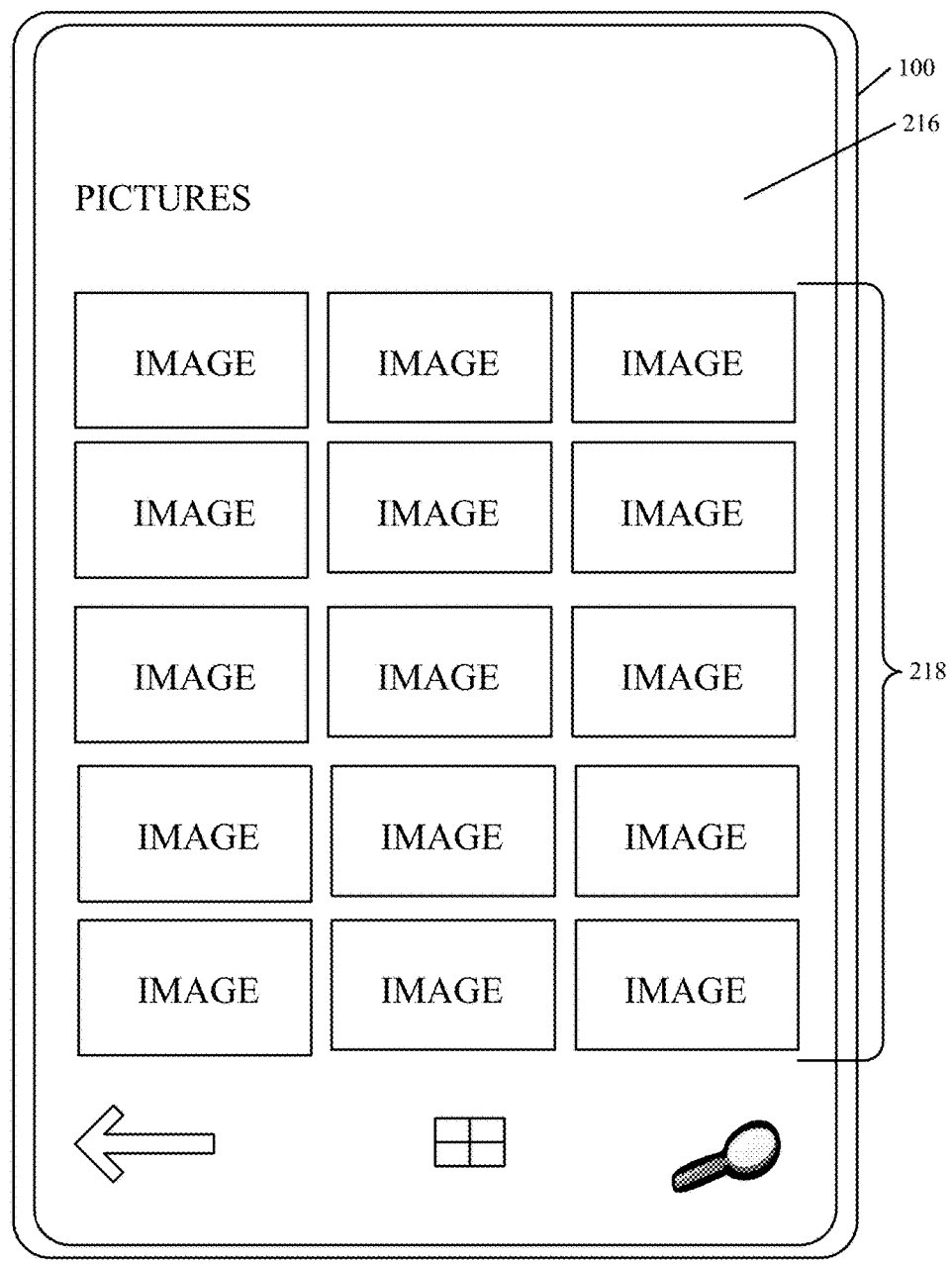

FIG. 3G shows one embodiment of mobile device 100, where the user has allowed the adjustment in FIG. 3F to take place. It can be seen in FIG. 3G that user interface display 216 now displays additional content. That is, it has reduced the size of each of the pictures 218 displayed thereon to accommodate for the reduced distance between the user's face and mobile device 100, thus increasing the number of pictures displayed.

Figure 3H:
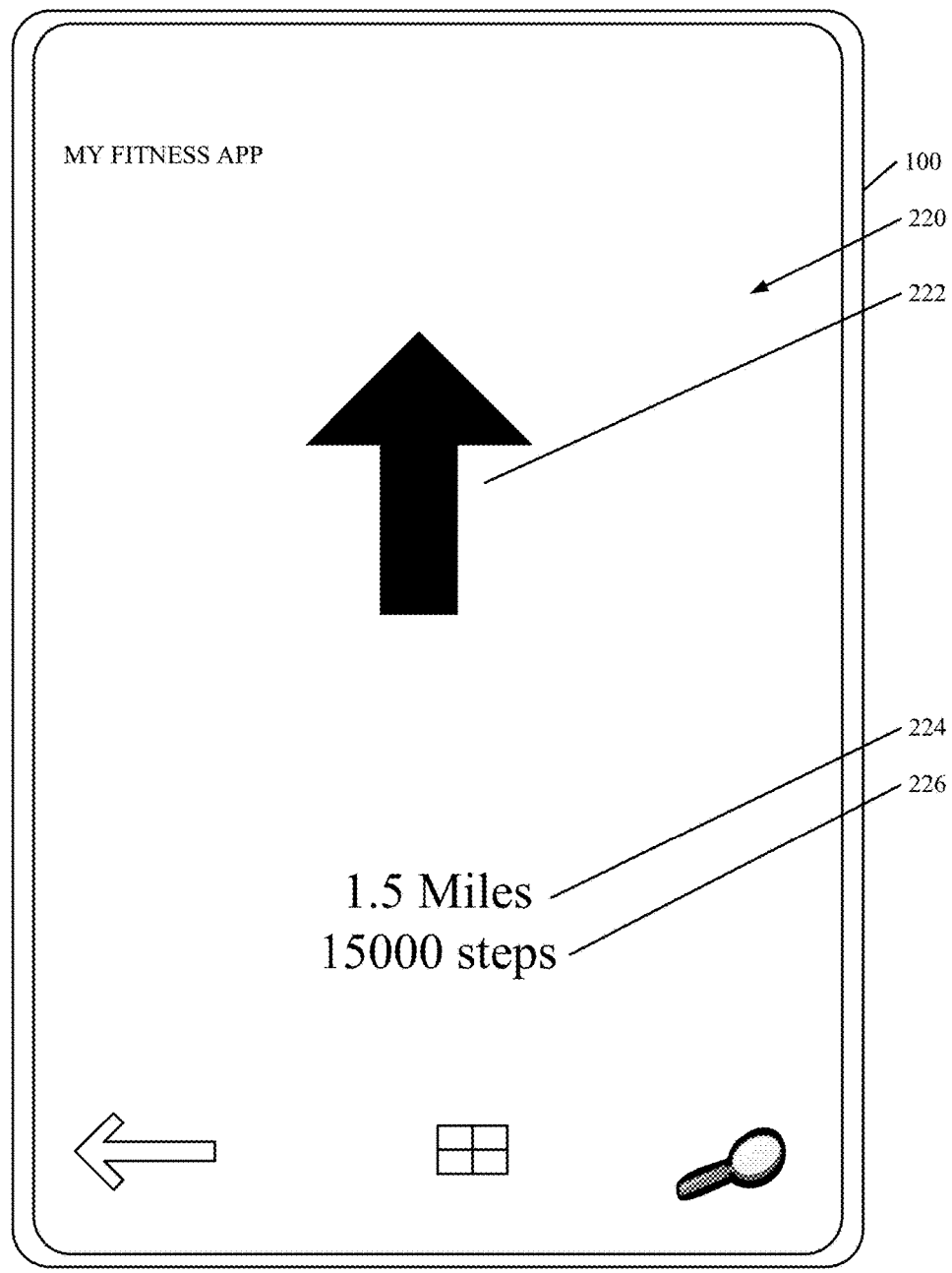

FIG. 3H shows one embodiment where the proximity metric (e.g., the sensed distance that the user's face is from mobile device 100) is combined with the output of an accelerometer. FIG. 3H shows that mobile device 100 is running a fitness application. Therefore, it includes a user interface display 220 generated by the fitness application. The fitness application may completely alter the information displayed on mobile device 100, based upon the inputs from sensor component 116 and the accelerometer. Where the fitness application is a running application, or a biking application, for instance, the accelerometer output (or a GPS output or another sensor output) may indicate the speed and direction of travel of the user. In that case, the fitness application can use that information, in addition to the distance metric output by component 116, to change the display. Where the user's face is relatively far from mobile device 100, the fitness application can show the direction on a pre-mapped path and the distance covered. It can be seen that user interface 220 includes a direction indicator 222 that generally instructs the user of the direction to travel. It includes a distance covered indicator 224 and a step number indicator 226 that indicate the distance covered and the number of steps taken, respectively.

It will be appreciated that the examples discussed above are exemplary only and a wide variety of other UI adjustments can be made as well. For instance, the user interface can be adjusted to show large, small or full screen previews of pictures or videos. It can be used to present different levels of information on social network applications or news reader applications, based upon the sensed distance metric. By way of example, in a news reader application, the user interface can be adjusted to show just headlines, when the user is detected at a relatively far distance from the mobile device 100, and the user interface can be adjusted to show increasing numbers of lines of news articles as the distance metric decreases. Where the application is a social network application, the number of posts or the content in the posts can be increased or decreased based on the sensed distance metric. Entertainment applications can adjust the user interface to show only an album cover when the distance metric is relatively large, and increase the detailed information displayed (such as artist, lyrics, etc.) when the distance metric decreases. Where the application is an accessibility application, if the accessibility settings on the device 100 are turned on, then the text can be adjusted to be even larger than it would otherwise be displayed. If the mobile device 100 is a reader or viewer, then the distance metric can be combined with an ambient light sensor signal such that, if the user is reading in a low light condition, then the colors of the user interface can be automatically inverted to show white text on a black background for better night time reading. These are examples only.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
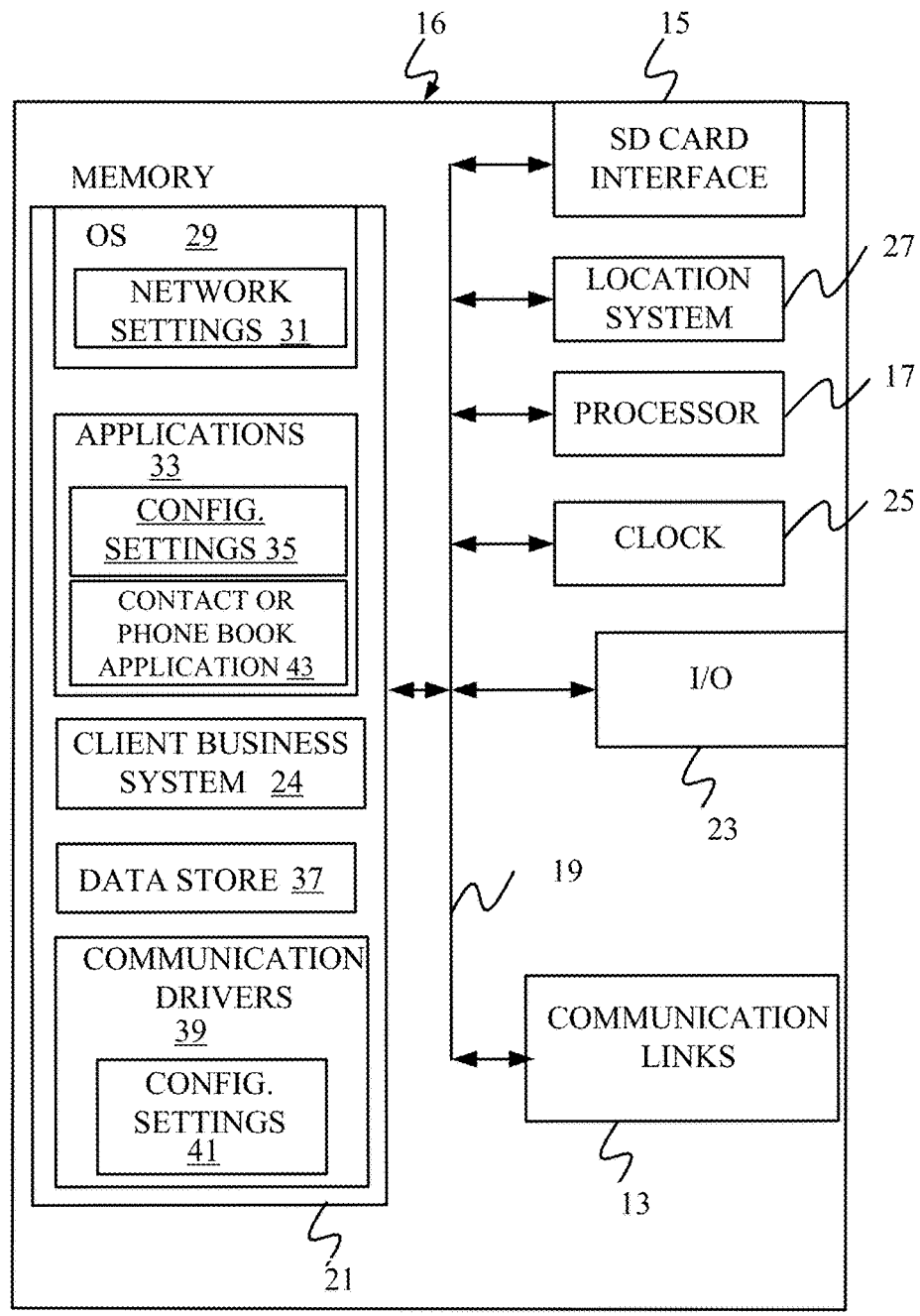
FIGS. 4-8 show additional embodiments of mobile devices.

FIG. 4 is another block diagram of another illustrative embodiment of a handheld or mobile computing device that can be used as a user's or client's mobile device 100, in which the present system (or parts of it) can be deployed. It shows a more detailed embodiment of some parts of the mobile device. FIGS. 5-8 are examples of handheld or mobile devices.

In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 102 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 5:
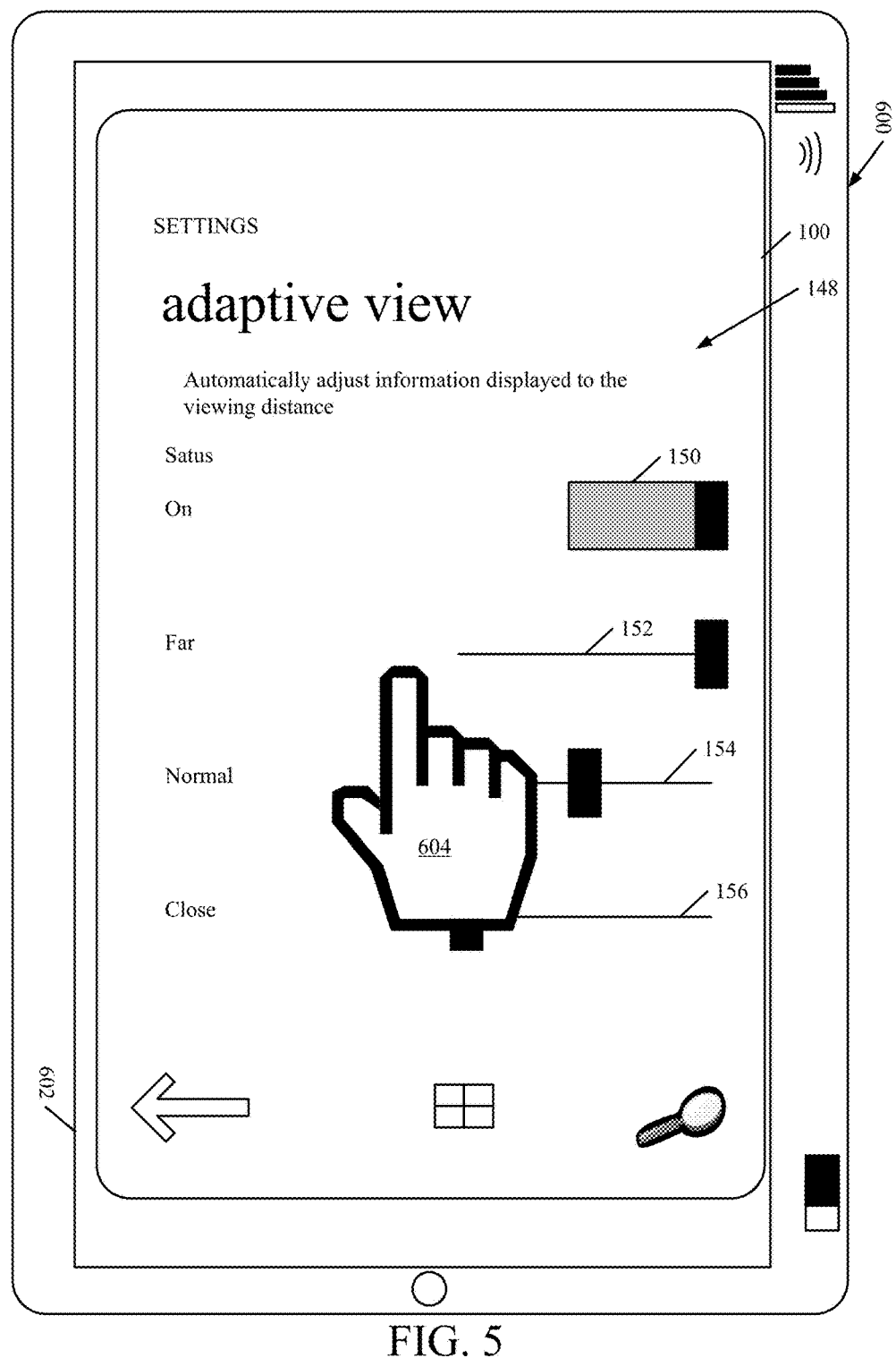

FIG. 5 shows one embodiment in which device 16 is a tablet computer 600. In FIG. 5, computer 600 is shown with user interface display from FIG. 3A displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 6:
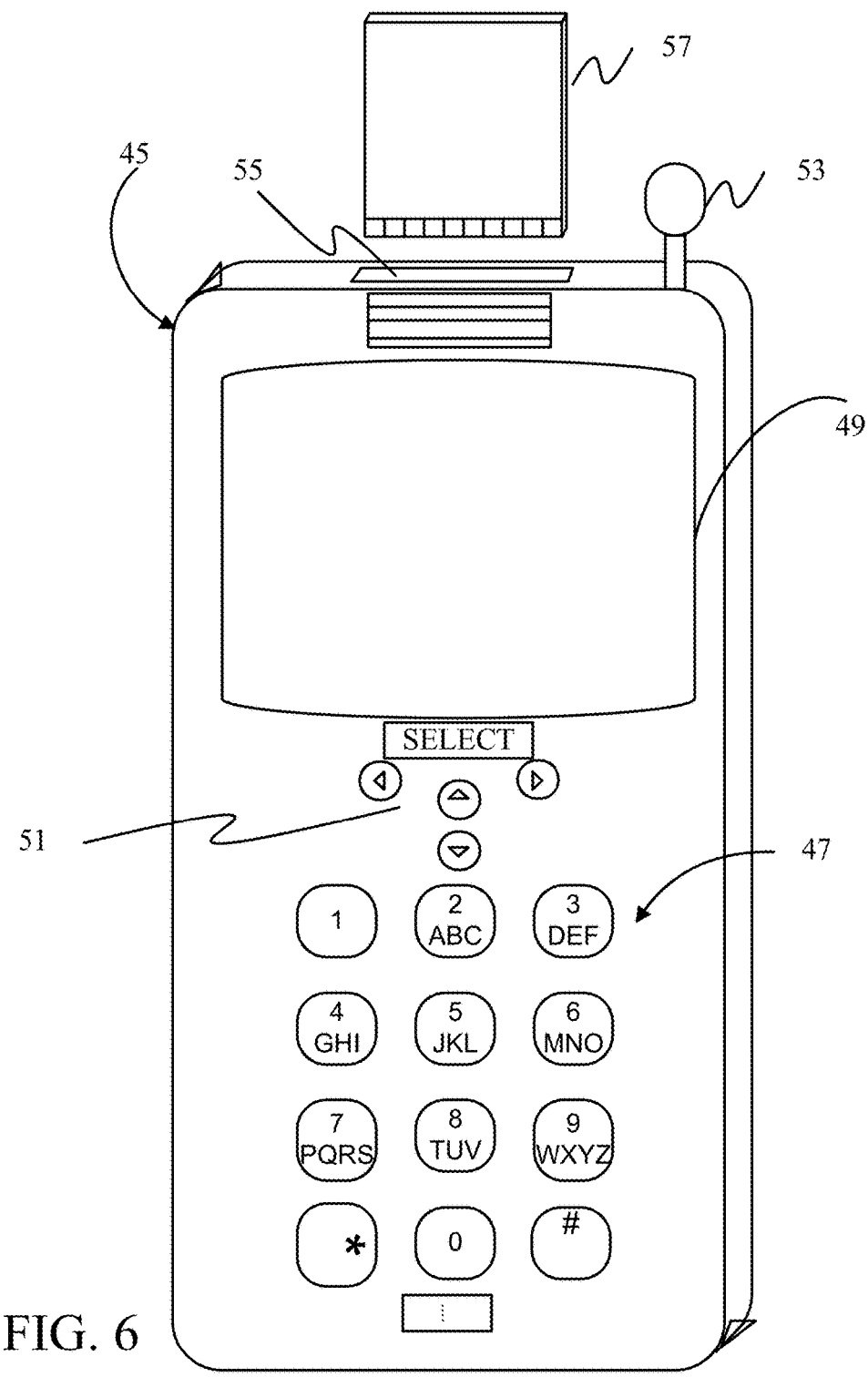
Figure 7:
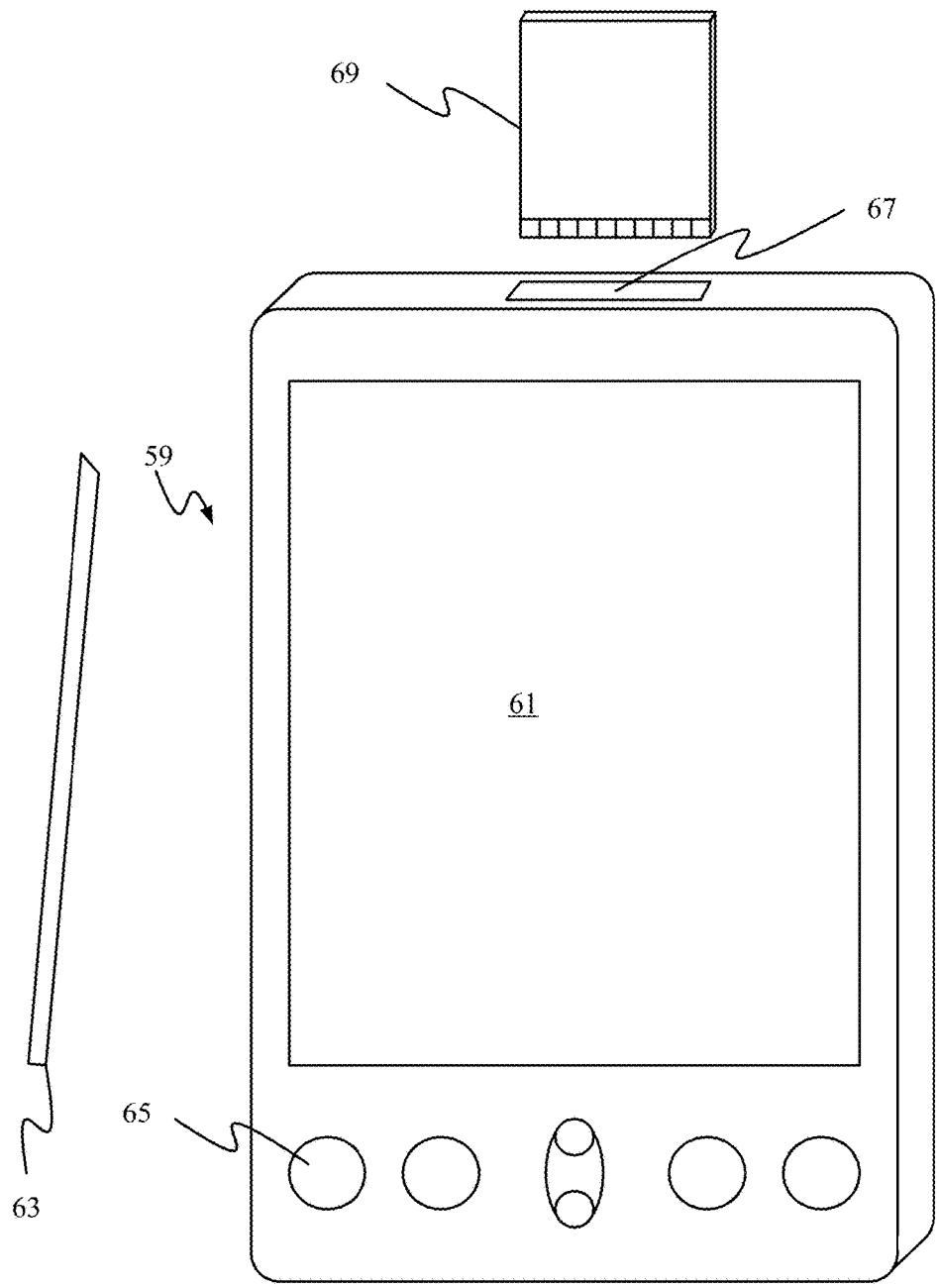

FIGS. 6 and 7 provide additional examples of devices 16 that can be used, although others can be used as well. In FIG. 6, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 7 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 8:
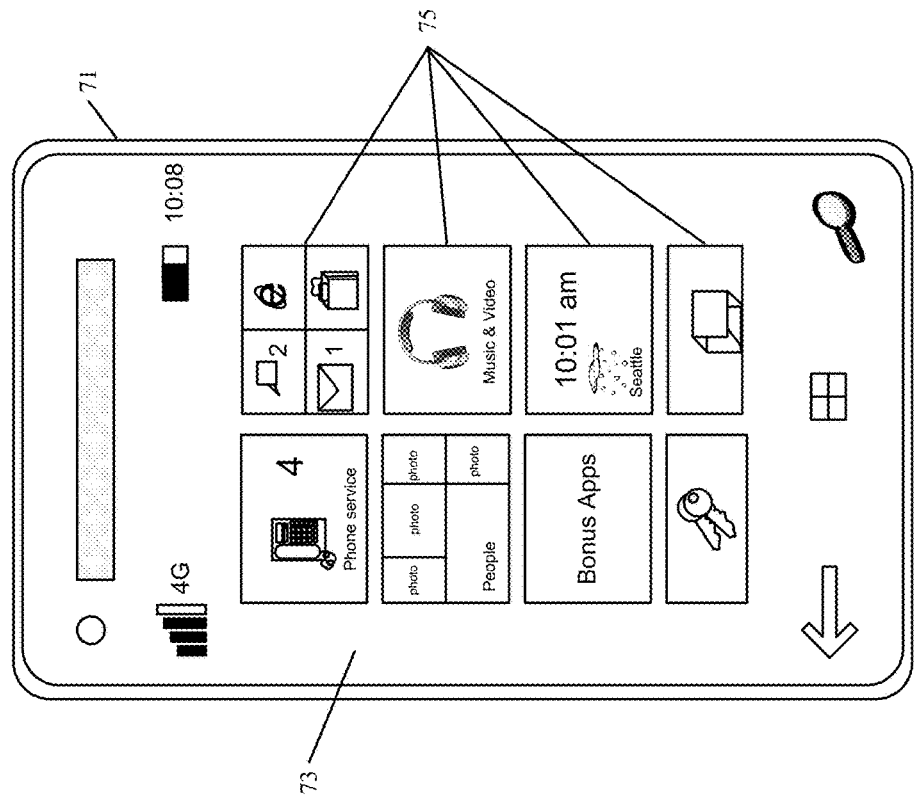

FIG. 8 is similar to FIG. 6 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
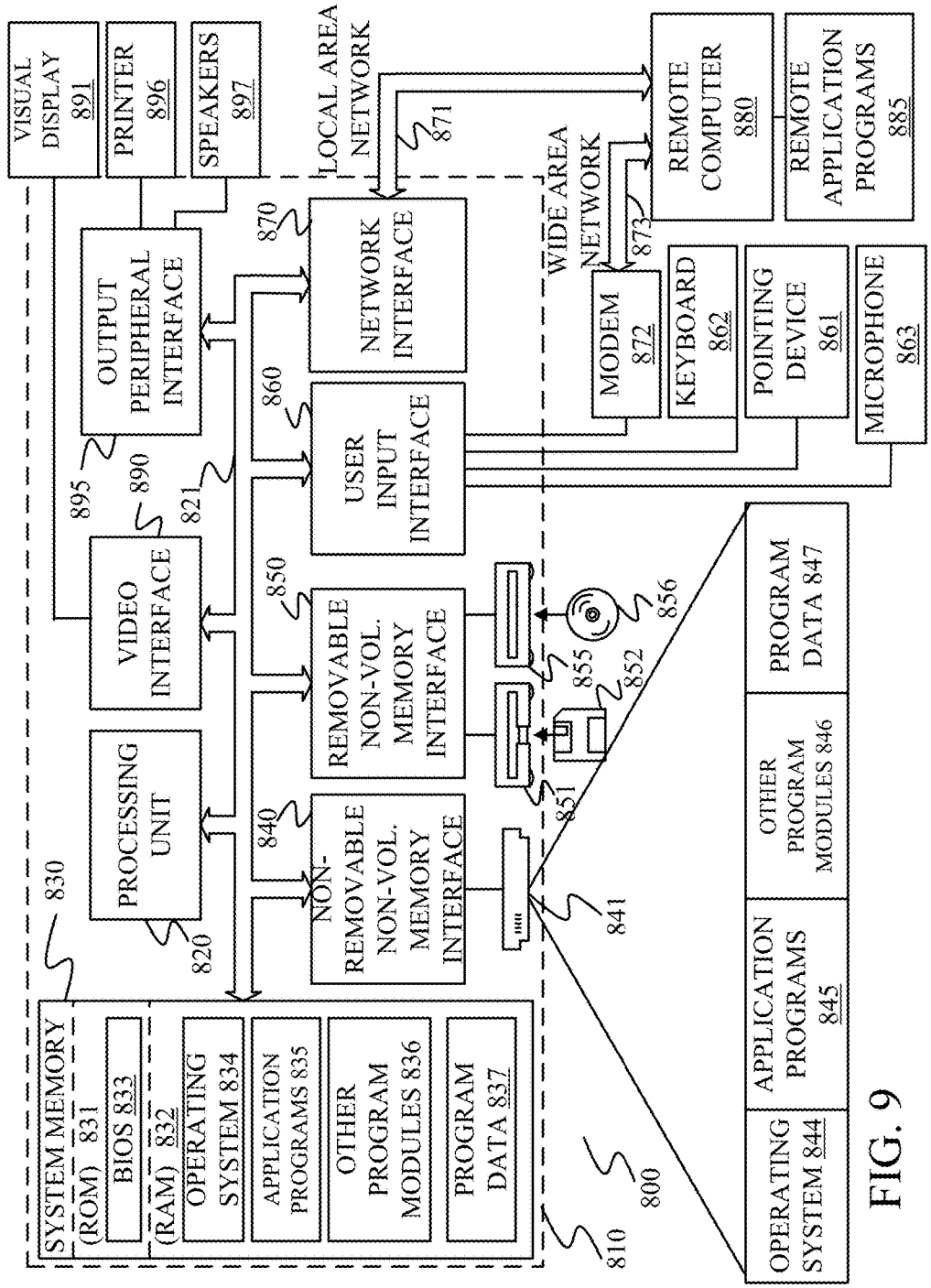
FIG. 9 is a block diagram of one embodiment of a computing environment.

FIG. 9 is one embodiment of another computing environment in which UI adjustment component 110 can be deployed. With reference to FIG. 9, an exemplary system for implementing some embodiments includes a general-purpose computing device in the form of a computer 810. Components of computer 810 may include, but are not limited to, a processing unit 820 (which can comprise processor 102), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    displaying a user configuration display with a magnitude user input mechanism that receives a user magnitude input;
    based on the user magnitude input, defining an adjustment magnitude for an automatic adjustment on a computing device;
    receiving a proximity sensor input indicative of a proximity of a portion of a user's body to the computing device;
    based on the proximity and the adjustment magnitude, determining an automatic adjustment to a visual characteristic of information displayed on a display device of the computing device;
    generating a notification display on the display device indicating the automatic adjustment; and
    performing the automatic adjustment to the visual characteristic of information displayed on the display device.

2. The computer-implemented method of claim 1 wherein performing the automatic adjustment comprises:
    adjusting a size of the information displayed on the display device based on the proximity.

3. The computer-implemented method of claim 1 wherein the notification display includes a cancel input mechanism configured to receive a user cancel input to cancel the automatic adjustment.

4. The computer-implemented method of claim 2 wherein adjusting the size comprises:
    changing a font size of text displayed on the display device based on the proximity.

5. The computer-implemented method of claim 2 wherein adjusting the size comprises:
    changing a size of images displayed on the display device based on the proximity.

6. The computer-implemented method of claim 1 wherein performing the automatic adjustment comprises:
    changing a lighting condition on the display device based on the proximity.

7. The computer-implemented method of claim 1 wherein performing the automatic adjustment comprises:
    providing the proximity to an application; and
    performing the automatic adjustment with the application.

8. The computer-implemented method of claim 1 wherein displaying the user configuration display comprises:
    displaying an on/off input mechanism that receives a user input to turn the automatic adjustment on and off.

9. The computer-implemented method of claim 1, wherein defining an adjustment magnitude comprises:
    reconfiguring the magnitude of adjustments made when the proximity sensor signal indicates the proximity is in a plurality of different ranges.

10. A computing device, comprising:
    a display device;
    a proximity sensor component configured to sense a proximity of a portion of a user's body relative to a portion of the computing device; and
    a user interface adjustment component configured to:
        generate a configuration display on the display device that includes a magnitude user input mechanism;
        receive a user magnitude input through the magnitude user input mechanism that defines, for each of a plurality of different proximity ranges, a magnitude of adjustments made to a visual characteristic of information displayed on the display device during an automatic adjustment; and
        perform the automatic adjustment to the visual characteristic of the information displayed on the display device based on the sensed proximity.

11. The computing device of claim 10 wherein the user interface adjustment component adjusts a size of the information displayed on the display device based on the sensed proximity.

12. The computing device of claim 10 and further comprising a microphone and wherein the proximity sensor component comprises:
    an infrared sensor positioned proximate the microphone.

13. A computer-implemented method comprising:
generating a user configuration display with a plurality of adjustment configuration user input mechanisms corresponding to a plurality of different proximity ranges, each adjustment configuration user input mechanism configured to receive a user input that defines an automatic adjustment to how information is rendered to a user on a computing device when a proximity of a user to the computing device is within the corresponding proximity range;
receiving a proximity sensor input indicative of a distance of a portion of the user's body from a display device on the computing device;
selecting one of the plurality of different proximity ranges based on the distance;
identifying the automatic adjustment corresponding to the selected proximity range; and
performing the identified automatic adjustment to how information is rendered to the user on the computing device.

14. The computer-implemented method of claim 13, wherein the plurality of adjustment configuration user input mechanisms comprises a first adjustment configuration user input mechanism corresponding to a first proximity range and a second adjustment configuration user input mechanism corresponding to a second proximity range, and wherein the automatic adjustments corresponding to the first and second proximity ranges comprise different types of adjustments.

15. The computer-implemented method of claim 13 wherein the plurality of adjustment configuration user input mechanisms comprises a first adjustment configuration user input mechanism corresponding to a first proximity range and a second adjustment configuration user input mechanism corresponding to a second proximity range, and wherein the automatic adjustments corresponding to the first and second proximity ranges comprise different magnitudes of adjustments.

16. The computer-implemented method of claim 13, wherein the automatic adjustment comprises an automatic adjustment to a visual characteristic of information rendered on the display device.

17. The computer-implemented method of claim 13 further comprising:
receiving a user cancel input; and
cancelling the automatic adjustment in response to receiving the user cancel input.

18. The computer-implemented method of claim 13 further comprising:
displaying a notification display indicative of the automatic adjustment, the notification display comprising a cancel input mechanism configured to receive a user cancel input to cancel the automatic adjustment.

19. The computer-implemented method of claim 18 wherein the notification display comprising a user input mechanism that is actuatable to display the user configuration display.

20. The computer-implemented method of claim 14, wherein the different types of adjustments comprise at least two of:
adjusting a font size on the display device;
adjusting an image size on the display device;
adjusting a lighting characteristics of the display device;
adjusting a feedback mode of the computing device; and
changing content rendered by the computing device.

* * * * *